No. 857,012. PATENTED JUNE 18, 1907.
J. E. BELL.
TRAVELING GRATE SYSTEM.
APPLICATION FILED NOV. 26, 1904.
3 SHEETS—SHEET 1.
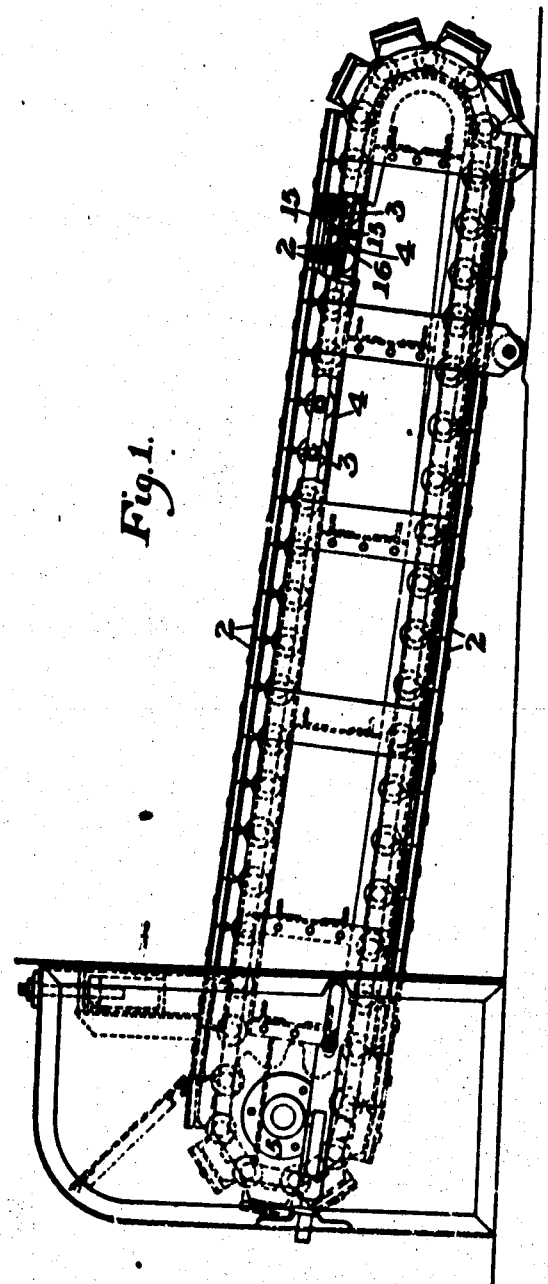
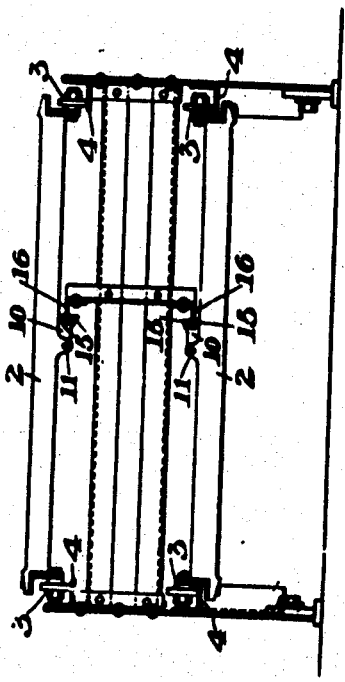
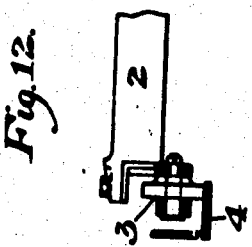
WITNESSES
INVENTOR
John E. Bell

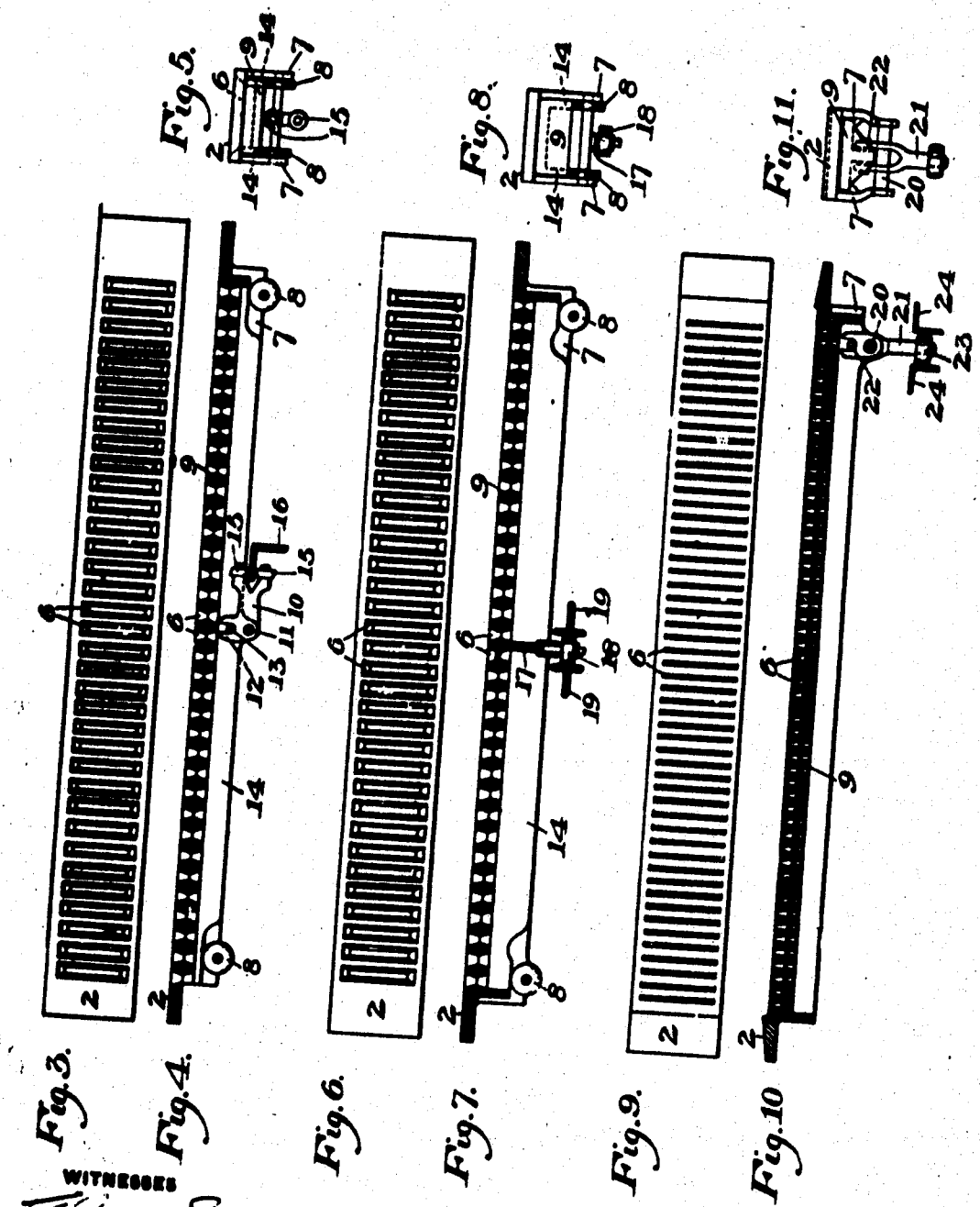

No. 857,012. PATENTED JUNE 18, 1907.
J. E. BELL.
TRAVELING GRATE SYSTEM.
APPLICATION FILED NOV. 26, 1904.
3 SHEETS—SHEET 3.
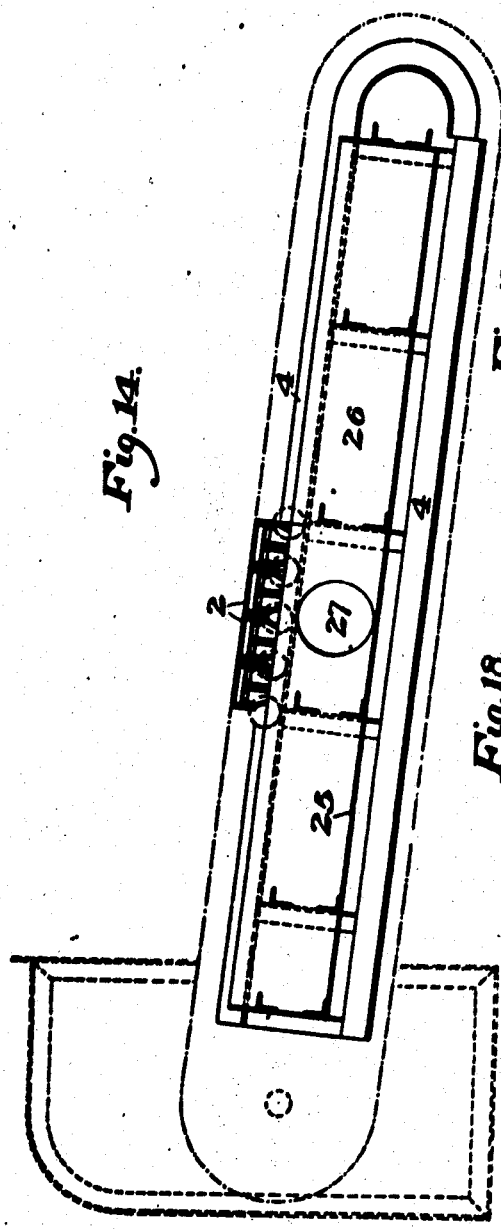
Fig. 14.
Fig. 17.
Fig. 18.
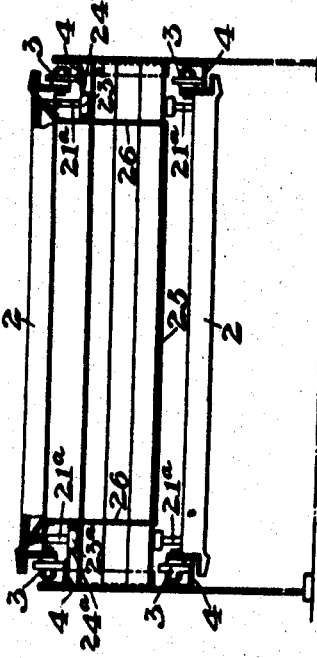
Fig. 16.
Fig. 15.
WITNESSES
INVENTOR
John E. Bell

UNITED STATES PATENT OFFICE.

JOHN E. BELL, OF BARBERTON, OHIO, ASSIGNOR TO THE BABCOCK & WILCOX COMPANY, OF NEW YORK, N. Y., A CORPORATION OF NEW JERSEY.

TRAVELING-GRATE SYSTEM.

No. 857,012.   Specification of Letters Patent.   Patented June 18, 1907.

Application filed November 20, 1904. Serial No. 234,365.

*To all whom it may concern:*

Be it known that I, JOHN E. BELL, of Barberton, Summit county, Ohio, have invented a new and useful Traveling-Grate System, of which the following is a full, clear, and exact description, reference being had to the accompanying drawings, forming part of this specification, in which—

Figure 1 is a side elevation of my improved traveling-grate partly broken away; Fig. 2 is a vertical cross-section of the same; Fig. 3 is a top plan view of one of the grate-bars; Fig. 4 is a longitudinal vertical section of the same, and Fig. 5 is an end elevation; Figs. 6, 7 and 8 are views similar to Figs. 3, 4 and 5, showing one modification; Figs. 9, 10 and 11 are similar views showing a third modification; Fig. 12 is a detail view showing the support for the grate; Fig. 13 is a detail view of one of the scrapers and adjacent parts; Fig. 14 is a side elevation showing a modified form of my invention adapted for forced blast; Fig. 15 is an enlarged cross-section of the same; Fig. 16 is a view similar to Fig. 15 showing another form of air box, and Figs. 17 and 18 are detail views showing two forms of lever device for shifting the dampers or sub-grate-bars.

My invention relates to the class of traveling-grate stokers, and is designed to provide for automatically varying the air inlet openings through the grate so that the amount of this air inlet area can be varied as desired at different points in the length of the grate.

It is generally known that the amount of air passing through the front portion of a traveling-grate should be more than that entering through the rear portion. As the bed of coal is reduced to ash less resistance is offered to the passage of air toward the rear end of the grate, and hence an excessive amount of air will enter this portion unless preventing means are employed, whereas the larger amount should be furnished to the front portion of the grate where the coal-bed is thicker and consequently a larger volume of air is desired.

My invention provides for varying the air inlet in different parts of the grate by moving dampers or sub-grate-bars during the travel of the grate, so as to vary the amount of air inlet area.

In the drawings, I show my invention as applied to the traveling-grate set forth and claimed in my co-pending application No. 233,600 filed Nov. 21, 1904. Thus in Figs. 1 and 2 I show the grate-bars 2 as secured to roller-chains 3, 3 which travel over upper and lower tracks 4, 4 and over the front sprocket-wheels 5 exterior to the furnace front.

In the preferred form of grate-bar which I employ, shown in Figs. 3, 4 and 5, the main grate-bar 2 consists of a web casting having a series of transverse slotted openings 6. The side webs or flanges 7, 7 of the main grate-bar carry spool-rollers 8, 8 on which are supported sub-bars 9. These sub-grate-bars 9 are narrower than the main grate-bar, so as to fit under and within it, and are provided with transverse slots arranged to register with those of the main grate-bar. In order to shift the sub-grate-bar, which acts as a damper, longitudinally of the main bar, and thus vary the amount of opening as desired, I have shown in this form a bell-crank lever 10 which is pivoted on a shaft 11 mounted in the side webs of the main grate-bar. The upper forked-arm 12 of this lever engages a pin 13 connecting the side web or flanged portions 14 of the sub-grate-bar, while the lower longer arm 10 is forked and provided with rollers 15. These rollers bear upon a plate or angle iron 16 which extends longitudinally of the grate at a level below the grate-bars. The shape of this guide or cam is such that it will actuate the levers of the several grate-bars and thus cause the shifting of the sub-bars. This shifting is preferably such that the air inlet area is greatly reduced toward the rear end of the grate, the sub-bars being returned to their first position before or after they pass around the sprocket-wheels and receive fresh coal. The shape and arrangement of this guide may however be varied so as to vary the air inlet area in any desirable manner. It will be noted that in this form the lever which moves the sub-bar is supported on the main bar, and hence expansion and contraction of the parts will not interfere with the proper action of the sub-bar or damper. I may, however, move the sub-bar in other ways. Thus, in Figs. 6, 7 and 8, I show the sub-bar as provided with a depending pin 17 carrying a roller 18 which moves between fixed guides 19 extending longitudinally of the grate below the upper part of its travel. These guide bars may be adjusted so as to move the sub-bars to either side independent of the main grate-bars.

In the preferred form of device shown in Figs. 9, 10 and 11 the main grate-bar is provided with an end pin or trunnion 20 carrying a lever 21 whose upper end engages a pin 22 on the sub-bar. The lower end of the lever carries a roller 23 which extends between the guide-bars 24. The guide-bars act to swing the lever and thus move the sub-bar longitudinally of the main bar.

In Figs. 14 to 18 inclusive I show my invention arranged in connection with an air-box for forcing air from the grate-bars under pressure. Thus, in Figs. 14 and 15 I show an open-topped air-box having a closed bottom 25 and sides 26 which fits closely up against the lower surfaces of the grate-bars and may extend any desirable portion of the length of the grate, preferably the major part of its length. I show the front end of the box as near as practicable to the front sprocket wheels, and the back end terminating where the bars begin to open up as they pass over the curved guides at the rear. The bottom of the box is riveted to and supported by the cross angles of the stoker frame above the grate-bars and the lower path of their travel. The air-box is preferably of nearly the same width as the length of the grate-bars, and the movable or sub-bars of the grate are made with an inclined web at each end which prevents the air from passing out of the blast-box without flowing up through the grate. Air may be forced into the box in any desirable manner, for example, by the pipe 27 shown in Fig. 14. In this form I show the sub-grate-bars or dampers as actuated by the rollers 23ª carried by levers 21ª, these being pivotally mounted on the main grate-bars as in the form of Figs. 9, 10 and 11, and actuated by similar tracks or guides 21ᶜ. These actuating levers may be arranged at one or both sides of the air-box, being exterior to the same, so that the sub-grate-bars which form the cover for the air-box may be shifted across its top as desired to change the area of the air inlet openings in the main grate-bars. Fig. 18 shows a detail of the lever in this form.

In Figs. 16 and 17 I show another form of the air-box in which it is made in the form of two boxes separated along the longitudinal central plane of the grate, each box having a bottom 25ᵇ and sides 26ᵇ and an open top as before. In this case the actuating lever 21ᵇ is hung at the center of the main grate-bar and the guide or cam track 24ᵇ for the roller 23ᵇ is arranged between the two longitudinal air-boxes. In this form the inclined transverse web of the sub-bar which directs the blast, is at the center of the bar.

The advantages of my invention result from the mechanical adjusting of the air inlet opening. As the volume of air passing up through a grate depends upon the area of the openings and the amount of draft pressure, either of these may be varied to change the air supply. In my system I vary the area of the air supply, while the pressure may remain constant. The varying of this air inlet area is mechanically carried out, so that the air inlet at different points and lengths of the grate may be varied as desired to give a maximum efficiency. The sub-bar or damper may have a motion in another direction, for example, at right angles to its length. The sub-bar may be carried directly by the chain independently of the main bar, and may be adjusted by other means such as end lugs or rollers in contact with guide-ways on the side frames; and many other variations may be made in the form and arrangement of the traveling-grate, the dampers or sub-bars; the means for moving them, &c., without departing from my invention, since what I consider myself the first to automatically adjust or vary the air inlet space in a traveling-grate stoker. A blast box may be employed below the upper portion of the grate, if forced blast is employed, in which case the sub-bars will regulate the amount of air flowing in from this blast box.

I claim:

1. In a traveling grate stoker, main grate bars having air openings, and formed with side webs or flanges, rollers carried by the side webs or flanges, and sub-grate bars mounted on said rollers for endwise movement; substantially as described.

2. In a traveling grate stoker, main grate bars having air openings therein, and formed with side webs or flanges, rollers carried by the said webs or flanges, endwise-movable sub-grate bars mounted on said rollers, and means for actuating the sub-grate bars as they travel; substantially as described.

3. In a traveling grate stoker, an endless grate having main grate bars provided with air inlet openings, movable sub-grate bars carried by the main grate bars and acting as dampers to control the admission of air through the said openings, levers depending from the main grate bars and movable therewith, said levers having an actuating connection with the sub-grate bars, and fixed cams for actuating the levers; substantially as described.

4. In a traveling grate stoker, a main grate bar, a sub-grate bar carried by the main bar, a bell crank lever pivoted to the main bar and engaging the sub-grate bar, and fixed cam means engaged by said lever; substantially as described.

In testimony whereof, I have hereunto set my hand.

JOHN E. BELL.

Witnesses:
MARY E. HAMLIN,
G. F. KEYS.